![US008249522B2]

(12) United States Patent
Lim et al.

(10) Patent No.: US 8,249,522 B2
(45) Date of Patent: Aug. 21, 2012

(54) APPARATUS AND METHOD FOR TRANSMITTING/RECEIVING CONTROL MESSAGE IN WIRELESS COMMUNICATION SYSTEM

(75) Inventors: Jun-Sung Lim, Seongnam-si (KR); Jeong-Ho Park, Seoul (KR); Su-Ryong Jeong, Suwon-si (KR); Hyeon-Woo Lee, Suwon-si (KR); Ho-Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 678 days.

(21) Appl. No.: 12/381,181

(22) Filed: Mar. 9, 2009

(65) Prior Publication Data

US 2009/0227212 A1    Sep. 10, 2009

(30) Foreign Application Priority Data

Mar. 7, 2008   (KR) ........................ 10-2008-0021723

(51) Int. Cl.
*H04B 1/00*     (2006.01)
*H04B 7/00*     (2006.01)

(52) U.S. Cl. ......................................................... 455/72
(58) Field of Classification Search .................... 455/72
See application file for complete search history.

(56) References Cited

U.S. PATENT DOCUMENTS 5,784,006 A * 7/1998 Hochstein ..................... 340/905

* cited by examiner

*Primary Examiner* — John Poos

(57) ABSTRACT

Disclosed is an apparatus and method for transmitting/receiving a control message in a wireless communication system that is designed to reduce overhead associated with transmission/reception of the control message. To this end, a transmission apparatus generates a control message, generates a compressed control message by compressing the generated control message, based on a control message that has been lastly received by a reception apparatus from among previously transmitted control messages, selects one of the generated control message and the generated compressed control message according to whether or not the control message lastly received by the reception apparatus exists, and transmits the selected one of the generated control message and the generated compressed control message to the reception apparatus. Therefore, it is possible to reduce resources used for control message transmission, and thus increase the use efficiency of the resources.

26 Claims, 6 Drawing Sheets

APPARATUS AND METHOD FOR TRANSMITTING/RECEIVING CONTROL MESSAGE IN WIRELESS COMMUNICATION SYSTEM

CROSS-REFERENCE TO RELATED APPLICATION(S) AND CLAIM OF PRIORITY

The present application claims priority to applications entitled "Apparatus and Method for Transmitting/Receiving Control Message in Wireless Communication System" filed in the Korean Industrial Property Office on Mar. 7, 2008 and assigned Serial No. 10-2008-0021723, the contents of which are hereby incorporated by reference.

TECHNICAL FIELD OF THE INVENTION

The present invention relates to an apparatus and method for transmitting/receiving a control message in a wireless communication system, and more particularly to an apparatus and method for transmitting/receiving a control message, which is designed to reduce overhead associated with control message transmission/reception.

BACKGROUND OF THE INVENTION

In a wireless communication system, various types of messages are transmitted/received in order to provide a communication service. Such messages may be largely divided into two types; a data message and a control message. The data message refers to a message configured by data corresponding to a communication service, and the control message refers to a message configured by control information that is required to receive the data message. Here, the control information refers to information that a transmitter and a receiver must share so as to provide the communication service or be provided with the communication service.

In addition, various control techniques aimed at improving the performance of the system are proposed in a wireless communication system. Typical examples of the control techniques include a control technique for resource allocation, a control technique for increasing the transmission efficiency of a resource, and other control techniques.

The control technique for resource allocation refers to a control technique that enables multiple users to share and use a specific resource in a wireless communication system. The control technique for increasing the transmission efficiency of a resource refers collectively to a hybrid automatic repeat request (HARQ) technique, a multiple-input multiple-output (MIMO) technique, an adaptive modulation technique, a power control technique, etc.

In this way, various and complex control techniques are used in a wireless communication system, which results in an unavoidable increase in the types of control information. This causes a problem in that an increase in the amount of control information in a wireless communication is also unavoidable.

On account of this, a wireless communication system needs a way to reduce overhead associated with control message transmission/reception that is caused by an increase in the amount of transmitted/received control information. Moreover, since a reduction in overhead associated with control message transmission/reception makes it possible to efficiently use limited wireless resources in a wireless communication system, various proposals to reduce the overhead associated with control message transmission/reception are under discussion in the wireless communication system.

SUMMARY OF THE INVENTION

To address the above-discussed deficiencies of the prior art, it is a primary object of the present invention to solve at least the above-mentioned problems occurring in the prior art, and the present invention provides an apparatus and method for transmitting/receiving a control message in a wireless communication system that is designed to reduce overhead associated with control information.

Also, the present invention provides an apparatus and method for transmitting/receiving a control message in a wireless communication system, wherein the control message is compressed and transmitted based on a previously transmitted control message.

Further, the present invention provides an apparatus and method for transmitting/receiving a control message in a wireless communication system, wherein the control message is configured and transmitted in consideration of change characteristics of control information.

Further, the present invention provides an apparatus and method for transmitting/receiving a control message in a wireless communication system that makes it possible to confirm whether or not the control message is successfully received.

Further, the present invention provides an apparatus and method for transmitting/receiving a control message in a wireless communication system that is designed to recover the control message compressed and transmitted for overhead reduction.

In accordance with an aspect of the present invention, there is provided an apparatus for transmitting a control message in a wireless communication system. The apparatus includes a control message generator for generating a control message; a storage for storing a control message that has been lastly received by a reception apparatus from among previously transmitted control messages; a joint compressor for generating a compressed control message by compressing the control message generated by the control message generator based on the control message stored in the storage; a switch for receiving the control message generated by the control message generator and the compressed control message generated by the joint compressor, and outputting one of the control message generated by the control message generator and compressed control message generated by the joint compressor according to a switching control signal; and a transmitter for transmitting the control message, output from the switch, to the reception apparatus.

In accordance with another aspect of the present invention, there is provided a method of transmitting a control message in a wireless communication system. The method includes the steps of generating a control message; generating a compressed control message by compressing the generated control message based on a control message that has been lastly received by a reception apparatus from among previously transmitted control messages; selecting one of the generated control message and the generated compressed control message according to whether or not the control message lastly received by the reception apparatus exists; and transmitting the selected one of the generated control message and the generated compressed control message to the reception apparatus.

In accordance with yet another aspect of the present invention, there is provided an apparatus for receiving a control message in a wireless broadcast communication system. The apparatus includes a receiver for receiving a control message transmitted from a transmission apparatus; a controller for generating a switching control signal in correspondence with an identifier indicating a compression or a non-compression included in the received control message; a switch for outputting the received control message to any one of two output ends according to the switching control signal; and a joint decompressor for identifying each bit value of a bit stream included in the control message output according to the switching control signal, and outputting a bit value identical to the identified bit value or a reversed bit value thereof from a bit stream included in a lastly received jointly compressed control message.

In accordance with still yet another aspect of the present invention, there is provided a method of receiving a control message in a wireless communication system. The method includes the steps of receiving a control message transmitted from a transmission apparatus; generating a switching control signal in correspondence with an identifier indicating compression or non-compression included in the received control message; outputting the received control message to any one of two output ends according to the switching control signal; and identifying each bit value in a bit stream included in the control message output according to the switching control signal, and outputting, as a decompression bit value, a bit value identical to the identified bit value or a reversed bit value thereof from a bit stream included in a lastly received jointly compressed control message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
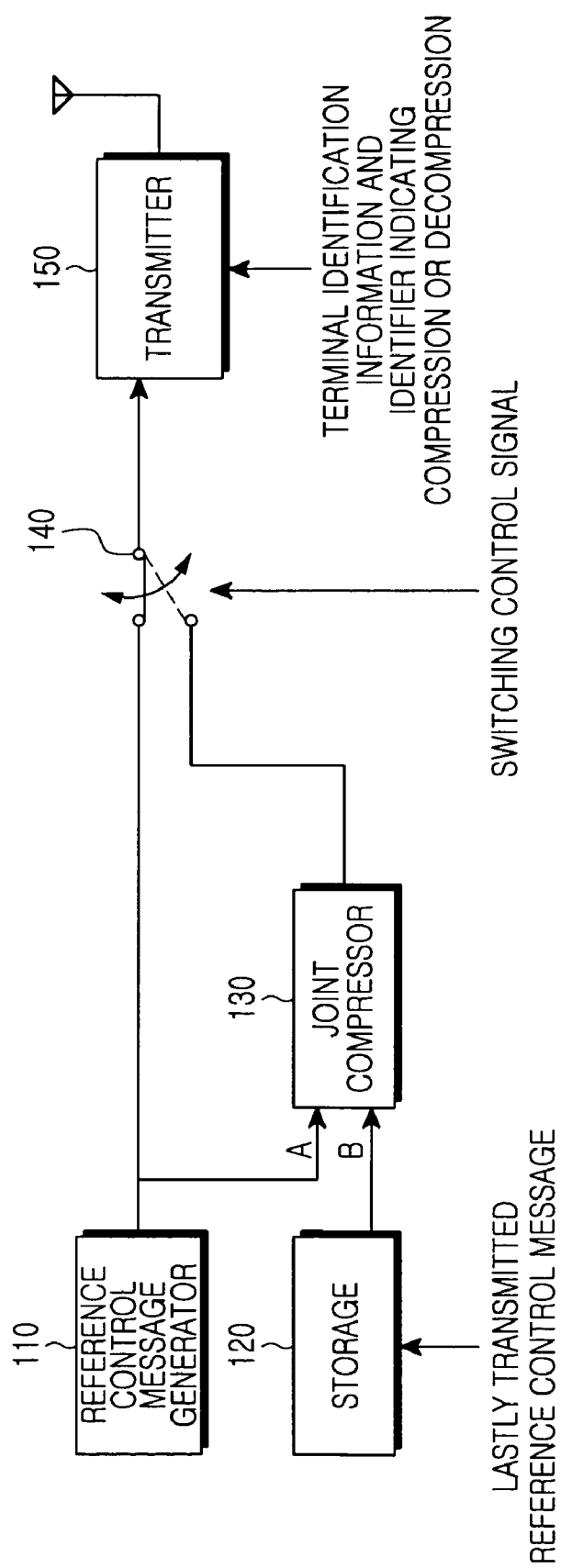
FIG. 1 is a block diagram illustrating a structure of an apparatus for transmitting a control message in a wireless communication system in accordance with an exemplary embodiment of the present invention.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, exemplary embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the gist of the present invention.

In a wireless communication system, control information transmitted from a transmission apparatus (e.g., a base station) to a reception apparatus (e.g., a terminal) is largely divided into two types. One of these two types is reference type information including all control information that must be transmitted to the reception apparatus. The other is toggle type control information wherein parts to be changed in the reference type information are toggled. The toggle type information includes unchanged parts in the reference type information that are compressed by various compression methods.

Information to be transmitted to a reception apparatus in each frame includes full dynamic information that must be changed in each frame, less dynamic information that is not changed during a specific period of time, semi-static information that is almost not changed, reserved information for other purposes that currently are not used, and so forth.

Once a reception apparatus successfully receives reference type control information in a current frame, a transmission apparatus transmits toggle type control information, which is compressed based on the reference type control information, to the reception apparatus from a next frame. Thus, the transmission apparatus can reduce overhead associated with transmission of semi-static information or less dynamic information.

When control information is broadcasted, a transmission apparatus transmits reference type control information, and then transmits toggle type control information to a reception apparatus that successfully decodes the transmitted control information. Also, when a new reception apparatus is added, a transmission apparatus transmits reference type control information, and then transmits toggle type control information by repeating the above-mentioned process.

In the following embodiments of the present invention, a method of compressing a control message and an apparatus and method for transmitting/receiving a control signal that are designed to minimize overhead occurring when a control message including control information is transmitted, will be described in detail.

Also, in the embodiments of the present invention, a control message to be transmitted by a transmission apparatus will be divided into a reference type control message (hereinafter referred to as "reference control message") and a joint compression type control message (hereinafter referred to as "compressed control message"), and these two types of control messages will be separately described. Here, the reference control message refers to a control message that is transmitted without being compressed, and the compressed control message refers to a control message that is compressed by a predetermined compression technique and then is transmitted.

Reference will now be made to exemplary embodiments of the present invention, with reference to the accompanying drawings.

FIG. 1 illustrates a structure of an apparatus for transmitting a control message in a wireless communication system according to an exemplary embodiment of the present invention. That is, FIG. 1 illustrates a structure of a transmission apparatus for compressing a control message to be transmitted to a reception apparatus, based on a previously transmitted control message, and then transmitting the compressed control message to the reception apparatus in a wireless communication system.

Referring to FIG. 1, a reference control message generator 110 generates a reference control message A by using control data for providing a communication service in the wireless communication system. The control data includes all control data used for allocating a resource, improving the transmission efficiency of a resource, and others in the wireless communication system.

A storage 120 stores a reference control message that has been lastly received with success by the reception apparatus. That is, if a series of reference control messages are transmitted, the storage 120 stores the reference control message that the reception apparatus has reported lastly to successfully receive from among the transmitted control messages (hereinafter, such a stored reference control message will be referred to as "lastly transmitted reference control message B").

The reference control message A generated by the reference control message 110 and the lastly transmitted reference control message B stored in the storage 120 are output to a joint compressor 130. Here, the reference control message A is also output to one of two input ends of a switch 140.

The joint compressor 130 compresses the reference control message A by using a predetermined compression technique in consideration of the lastly transmitted reference control message B. Also, the joint compressor 130 outputs a compressed control message by using the compressed reference control message A. The joint compressor 130 may use various compression techniques.

Hereinafter, a more detailed description will be given of the above-mentioned joint compressor 130. The joint compressor 130 compares the reference control message A with the lastly transmitted reference control message B on a bit-by-bit basis, and generates each bit of the compressed control message by using the result of the comparison. That is, when a bit value at a specific position of a bit stream included in the reference control message A is not identical to a bit value at the same position of a bit stream included in the lastly transmitted control message B, the joint compressor 130 determines a specific value (0 or 1) as a bit value at the same position of a bit stream to be included in the compressed control message. In contrast, when a bit value at a specific position of a bit stream included in the reference control message A is identical to a bit value at the same position of a bit stream included in the lastly transmitted control message B, the joint compressor 130 determines a specific value (1 or 0) as a bit value at the same position of a bit stream to be included in the compressed control message.

Subsequently, the joint compressor 130 compresses consecutive identical bit values of the bit stream included in the compressed control message by using a run-length technique. The run-length compression technique is a compression technique in which consecutive identical values are represented by a pair-wise sequence. For example, when the run-length compression technique is applied to a bit stream of "00000111" included in the compressed control message, the bit stream can be represented by (5,0), (3,1).

The compressed control message output from the joint compressor 130 is output from the other input end of the switch 140.

The switch 140 receives the reference control message A output from the reference control message generator 110 and the compressed control message output from the joint compressor 130. Also, the switch 140 outputs one of the reference control message A and the compressed control message according to a switching operation based on a switching control signal output from the outside. A way to select one of the reference control message A and the compressed control message, based on the switching control signal, will be described in detail below.

A transmitter 150 receives a control message (the reference control message A or the compressed control message), terminal identification information, and an identifier indicating a compression or a non-compression, output from the switch 140. Here, the terminal identification information and the identifier indicating the compression or the non-compression are not compressed.

The transmitter 150 modulates the control message, the terminal identification information, and the identifier indicating the compression or the non-compression, output from the switch 140, and then transmits them through a transmit antenna.

Although not illustrated in FIG. 1, the transmission apparatus may further include a controller for outputting the switching control signal to the switch 140 according to whether or not the lastly transmitted reference control message B is stored in the storage 120. When the lastly transmitted reference control message is stored in the storage 120, the controller outputs a switching control signal, which controls the switch 140 to output the compressed control message, to the switch 140. Conversely, when the lastly transmitted reference control message is not stored in the storage 120, the controller outputs a switching control message, which controls the switch 140 to output the reference control message, to the switch 140.

Figure 2:
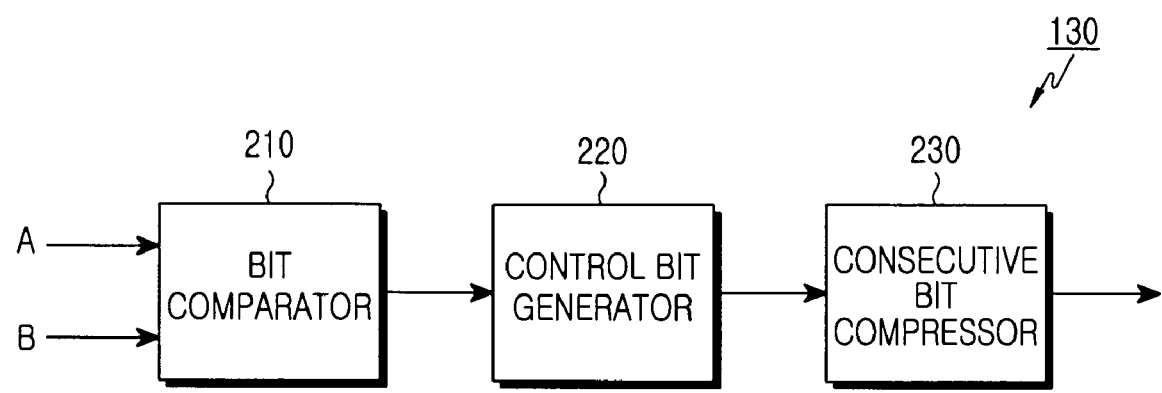
FIG. 2 is a block diagram illustrating, by way of example, a detailed structure of an exemplary joint compressor 130 to which a run-length compression technique is applied.

FIG. 2 illustrates a detailed structure of the joint compressor 130 in FIG. 1, which employs the run-length compression technique.

Referring to FIG. 2, the lastly transmitted reference control message B and the reference control message A are input into a bit comparator 210. The bit comparator 210 compares the lastly transmitted reference control message B with the reference control message A on a bit-by-bit basis, and then outputs the result of the comparison. That is, the bit comparator 210 determines if a bit value of a bit stream included in the reference control message A is identical to a bit value at the same position of a bit stream included in the lastly transmitted control message B, and then outputs a comparison result value corresponding thereto.

The comparison result value output from the bit comparator 210 is output to a control bit generator 220.

The control bit generator 220 generates each bit value for configuring a compressed control message, based on the comparison result value. That is, when the bit comparator 210 outputs a comparison result value indicating that bit values at a specific position of bit streams included in the reference control message A and the lastly transmitted reference control message B respectively are identical to each other, the control bit generator 220 generates a value of 1 as a control bit value for the specific bit of a bit stream to be included in the compressed control message. Conversely, when the bit comparator 21 outputs a comparison result value indicating that bit values at a specific position of bit streams included in the reference control message A and the lastly transmitted reference control message B respectively are not identical to each other, the control bit generator 220 generates a value of 0 as a control bit value for the specific bit of a bit stream to be included in the compressed control message. Of course, the control bit value may be reversely generated in the above two cases.

Through the above operation, the control bit generator 220 outputs a control bit stream for configuring the compressed control message, and the control bit stream is provided to a consecutive bit compressor 230.

The consecutive bit compressor 230 compresses consecutive identical bit values of the control bit stream by using the run-length compression technique. For example, when a control bit stream of "00000111" is provided to the consecutive bit compressor 230, the consecutive bit compressor 230 outputs a pair-wise sequence of (5,0), (3,1).

Figure 3:
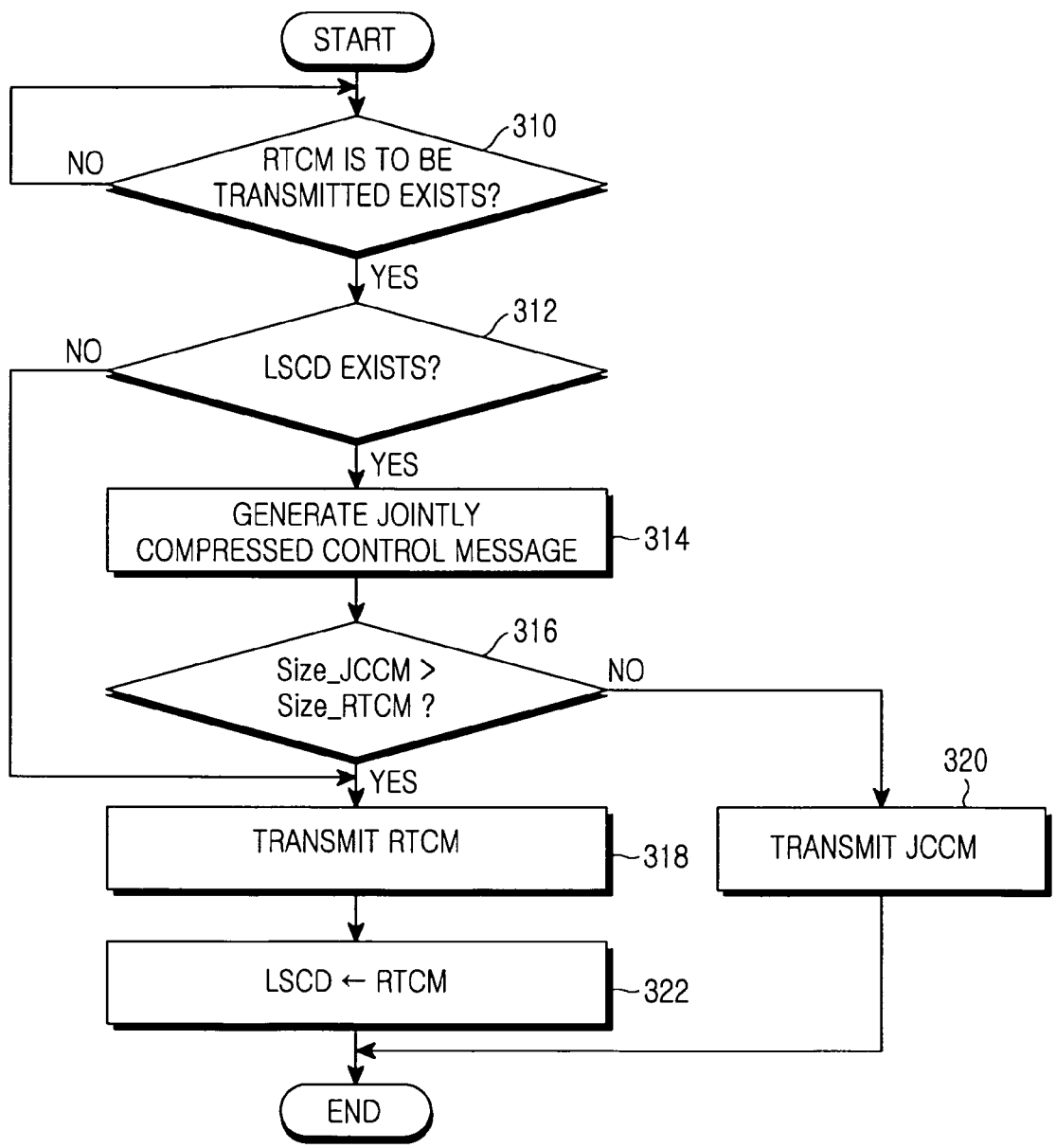
FIG. 3 is a flowchart illustrating control flow for transmitting a control message by a transmission apparatus in a wireless communication system in accordance with an exemplary embodiment of the present invention.

FIG. 3 illustrates control flow for transmitting a control message by a transmission apparatus in a wireless communication system according to an exemplary embodiment of the present invention. Among operations according to the control flow in FIG. 3, operations requiring decision may be performed by a controller constituting the transmission apparatus.

Referring to FIG. 3, in step 310, the transmission apparatus checks if a Reference Type Control Message (hereinafter referred to as "RTCM") to be transmitted exists. If the RTCM to be transmitted exists, the transmission apparatus proceeds to step 312.

In step 312, the transmission apparatus checks if a Lastly Saved Control Data (hereinafter referred to as "LSCD") exists. As mentioned above, the LSCD refers to a transmitted reference control message that a reception apparatus has lastly reported to successfully receive from among reference control messages transmitted from the transmission apparatus.

If the LSCD not exists, the transmission apparatus proceeds to step 318, and transmits the RTCM. That is, when there is no reference control message successfully received by the reception apparatus, the transmission apparatus transmits the RTCM without compressing it. This is the case where the transmission apparatus initially transmits the RTCM to the reception apparatus.

Conversely, if the LSCD exists, the transmission apparatus proceeds to step 314, and generates a Jointly Compressed Control Message (hereinafter referred to as "JCCM"). The JCCM is generated by comparing the RTCM with the LSCD on a bit-by-bit basis, generating a control bit stream based on the result of the comparison, and then applying the run-length compression technique to the generated control bit stream.

That is, when bit values at the same position of bit streams included in the LSCD and the RTCM respectively are not identical to each other, the transmission apparatus generates a value of 1 as a control bit value for the corresponding bit. In contrast, when bit values at the same position of bit streams included in the LSCD and the RTCM respectively are identical to each other, the transmission apparatus generates a value of 1 as a control bit value for the corresponding bit. Of course, in another embodiment of the present invention, the control bit value generated corresponding to each case may be set to other values.

The transmission apparatus represents consecutive identical values of a control bit stream consisting of such control bit values by a pair-wise sequence, thereby generating the JCCM.

Upon completing the generation of the JCCM, in step 316, the transmission apparatus compares the size of the JCCM (hereinafter referred to as "Size_JCCM") with size of the RTCM (hereinafter referred to as "Size_RTCM"). More specifically, the transmission apparatus determines if the Size_JCCM is larger than the Size_RTCM. The transmission apparatus proceeds to step 318 when the result of the determination shows that the Size_JCCM is larger than the Size_RTCM, and proceeds to step 320 when the result of the determination shows that the Size_JCCM is not larger than the Size_RTCM. In step 318, the transmission apparatus transmits the RTCM. Conversely, in step 320, the transmission apparatus transmits the JCCM.

The transmission apparatus transmits a smaller one of the JCCM and the RTCM through steps 316 to 320.

When the transmission apparatus transmits the RTCM in step 318, it proceeds to step 322, and updates the LSCD to the RTCM. Here, the LSCD is updated only when the transmitted RTCM is normally received by the reception apparatus. That is, the transmission apparatus updates the LSCD to the RTCM only when it determines that the reception apparatus successfully receives the transmitted RTCM. The updated LSCD is used to generate a JCCM in a next frame.

The following method may be proposed as a way for the transmission apparatus to determine if the RTCM or JCCM is successfully received by the reception apparatus. This method as proposed below distinguishes between a case where the RTCM or JCCM includes resource allocation information and a case where the RTCM or JCCM does not include resource allocation information.

First, when the RTCM or JCCM includes resource allocation information, the transmission apparatus determines if the RTCM or JCCM is successfully received, according to whether or not data information transmitted using a resource allocated through the resource allocation information is received. That is, when the transmission apparatus recognizes that data information transmitted using a resource allocated through the resource allocation information is successfully received by the reception apparatus, it determines that the RTCM or JCCM is also successfully received.

For example, in the case of downlink, the reception apparatus may successfully or unsuccessfully receive data information, and transmit a positive or negative acknowledgement (ACK or NACK) corresponding thereto to the transmission apparatus. Thus, by receiving an acknowledgment corresponding to the data information (ACK), the transmission apparatus can recognize that the RTCM or JCCM is successfully received. In the case of uplink, when the transmission apparatus successfully receives data information transmitted from the reception apparatus, the reception apparatus determines that the transmission apparatus successfully receives the RTCM or JCCM.

Next, when the RTCM or JCCM does not include resource allocation information, the transmission apparatus uses a receipt Acknowledgement (ACK) transmitted corresponding to the RTCM or JCCM from the reception apparatus to determine if the RTCM or JCCM is successfully received. When the transmission apparatus fails to receive an ACK corresponding to the RTCM or JCCM from the reception apparatus within a specific period of time t1, it determines that the reception apparatus fails in receiving the RTCM or JCCM.

Figure 4:
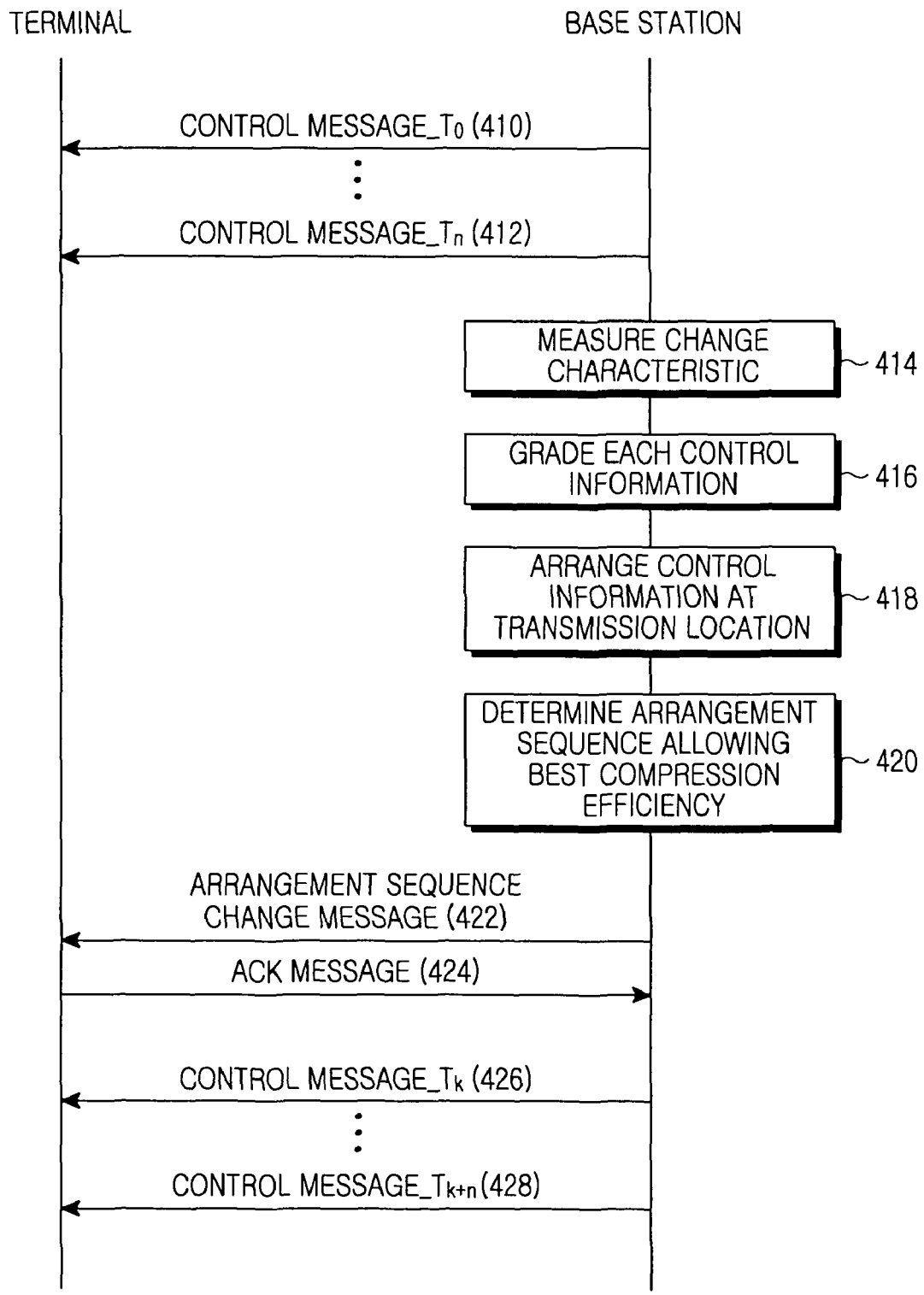
FIG. 4 is a view illustrating signaling for increasing compression efficiency by configuring a control message in consideration of a change characteristic of each control information in accordance with an exemplary embodiments of the present invention.

FIG. 4 illustrates signaling for improving compression efficiency by configuring a control message in consideration of the change characteristic of each control information according to an exemplary embodiment of the present invention.

In FIG. 4, a description will be given on the assumption that a base station corresponds to a transmission apparatus, and a terminal corresponds to a reception apparatus. However, it is obvious that signaling as proposed below may be applied when a terminal operates as a transmission apparatus, and a base station operates as a reception apparatus according to another embodiment of the present invention.

Signaling proposed in FIG. 4 assumes that one control message includes multiple control information. Also, in the following description, most operations to be performed in the base station are carried out by a controller in the base station.

Referring to FIG. 4, in steps 410 to 414 the base station transmits a plurality of control messages. Each of the plurality of control message includes multiple control information. Also, the plurality of control messages may be transmitted in a predetermined cycle. With respect to this, the base station and the terminal transmit the multiple control information by using arrangement information prearranged between the base station and the terminal for each control message. Here, the arrangement information refers to information on a position at which each of the multiple control information is arranged. Also, the arrangement information may be prearranged or changed through operations to be described below. In step 414, the base station measures the change characteristic of each control information transmitted through each control message. The control message is divided into control information with a full dynamic characteristic (full dynamic control information) and control information with a semi-dynamic characteristic (semi-dynamic control information). Also, the control information may be divided into more types of control information by additional change characteristics.

The full dynamic control information means control information that is changed whenever transmitted in each frame. Typical examples of the full dynamic control information include a modulation level, resource allocation information, etc. The semi-dynamic control information means control information that has little need to change information to be transmitted in each frame.

In step 416, the base station grades each control information in consideration of the measured change characteristic. The grade may be granted based on the change level of information that can be identified by the measured change characteristic.

In step 418, the base station arranges transmission locations for multiple control information in one control message in consideration of the grade granted to each control information. That is, the base station arranges transmission locations for multiple control information in such a manner that similarly graded control information neighbor each other. The arrangement sequence of the multiple control information may be set according to the system environment. Thus, in step 420, the base station determines an arrangement sequence allowing the best compression efficiency in consideration of the system environment.

Upon determining the arrangement sequence allowing the best compression efficiency, in step 422, the base station transmits the determined arrangement sequence to the terminal through an arrangement sequence change message.

Upon receiving the arrangement sequence change message, in step 424, the terminal transmits an acknowledgment message (ACK message) to the base station in response to the arrangement sequence change message. By receiving the ACK message, the base station recognizes that the terminal successfully receives the arrangement sequence change message.

Upon receiving the ACK message from the reception apparatus, the base station arranges the multiple control information in one control message by using the determined arrangement sequence. Thus, the base station can detect statistical change characteristics to arrange multiple control information in such a manner that control information with similar change characteristics neighbor each other. Accordingly, the base station can increase compression efficiency when compressing a control message by using the run-length compression technique.

In steps 426 to 428, the base station transmits a control message wherein multiple control message are arranged using the determined arrangement sequence. In addition, since the terminal already knows the determined arrangement sequence, it can identify multiple control information in each received control message.

Figure 5:
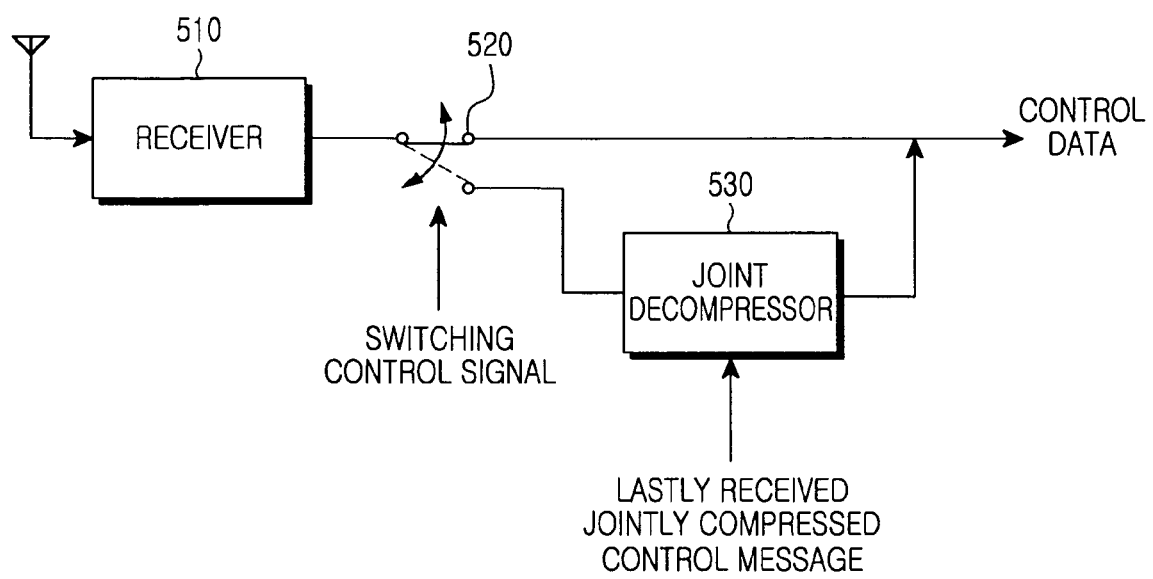
FIG. 5 is a block diagram illustrating a reception apparatus in accordance with an exemplary embodiment of the present invention.

FIG. 5 illustrates a structure of a reception apparatus according to an exemplary embodiment of the present invention.

Referring to FIG. 5, a receiver 510 receives a control message, transmitted from a transmission apparatus, through a receive antenna. Also, the receiver 510 demodulates and outputs the received control message. The control message output from the receiver 510 is input into a switch 520.

The switch 520 output the control message, provided from the receiver 510, to a joint decompressor 530 according to a corresponding switching control signal. The switching control signal is determined by an identifier, indicating compression or non-compression, included in the control message. That is, when the identifier indicates non-compression, and thus the control message is determined to be a reference control message (non-compressed control message), the switch control signal controls the switch 520 to output the control message as the final control message without decompression. However, when the identifier indicates compression, and thus the control message is determined to be a compressed control message (control message subjected to compression), the switching control signal controls the switch 520 to output the control message to the joint decompressor 530.

If the control message is input into the joint decompressor 530 through the switch 520, the joint decompressor 530 decompresses the input control message by using a decompression technique corresponding to a compression technique applied in the transmission apparatus. For example, when the transmission apparatus has compressed the control message by using the run-length compression technique, the joint decompressor 530 decompresses the control message by using a decompression technique corresponding to the run-length compression technique. In performing the decompression for the control message, the joint decompressor 530 makes reference to the lastly received jointly compressed control message.

Although not illustrated in FIG. 5, the reception apparatus transmits information regarding success or failure of reception of the control message to the transmission apparatus when the control message received from the transmission apparatus does not include resource allocation information. The information regarding success or failure of reception of the control message is received may be transmitted over an uplink control channel. The reason why the reception apparatus reports such information regarding success or failure of reception of the control message to the transmission apparatus is that such information allows the transmission apparatus to determine whether to compress the control message, as described above.

Figure 6:
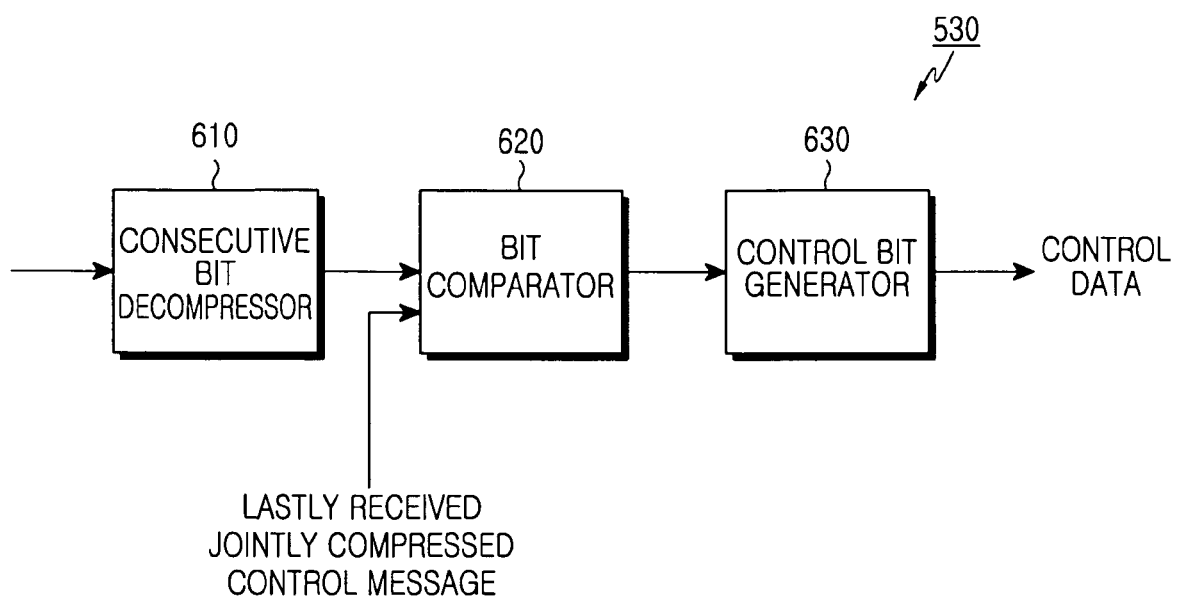
FIG. 6 is a block diagram illustrating a detailed structure of a joint decompressor 530 in FIG. 5.

FIG. 6 illustrates a detailed structure of the joint decompressor 530 in FIG. 5.

Referring to FIG. 6, a compressed control message is input into a consecutive bit decompressor 610, and the consecutive bit decompressor 610 decompresses compressed control information included in the compressed control message by using the run-length compression technique. Here, the control information decompressed from the compressed control message corresponds to a plurality of consecutive bits with an identical value. For example, when the compressed control information includes a pair-wise sequence of (5,0), (3,1), the consecutive bit decompressor 610 outputs a control bit stream of "00000111".

A bit comparator 620 receives the control bit stream output from the consecutive bit decompressor 610 and the lastly received jointly compressed control message, and checks if each bit value of the control bit stream has a specific value (0 or 1). Also, the bit comparator 620 outputs a bit value at the same position as the checked bit position or the reversed bit value thereof from a bit stream included in the lastly received jointly compressed control message.

For example, the bit comparator 620 checks if a bit value at a specific position of the control bit stream is 0. If the bit value at the specific position is 0, then the bit comparator 620 outputs a bit value at the specific position of a bit stream included in the lastly received jointly compressed control message. Conversely, if the bit value at the specific position of the control bit stream is 1, then the bit comparator 620 outputs the reversed bit value of a bit value at the specific position of a bit stream included in the lastly received jointly compressed control message.

A control bit generator 630 generates a control bit stream by using control bits values output from the bit comparator 620.

As described above, the apparatus and method for transmitting/receiving a control message in a wireless communication system can reduce overhead associated with transmission of control information by compressing and transmitting control information, such as resource allocation information, etc. Therefore, the present invention has an advantage in that the amount of resources used for transmission of control information can be reduced. Also, the present invention can increase transmission efficiency because an amount of resources for use in data transmission can be additionally ensured.

While the invention has been shown and described with reference to a certain exemplary embodiment thereof, it will be understood by those skilled in the art that various changes in form and details may be made therein without departing from the spirit and scope of the invention as defined by the appended claims and equivalents thereof. That is, in the above embodiments of the present invention, the format of a control message is not limited. Therefore, it is obvious that the present invention may be applied to not only a system employing the IEEE 802.16e but also systems employing other various communication schemes in the same manner. In the case of the system employing the IEEE 802.16e, an important message is transmitted through MAP. Even in this case, the control message compression technique proposed in the embodiments of the present invention will be also applied. Also, a message, such as compressed MAP, HARQ MAP IE, or sub-burst IE, may be used to transmit the MAP.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for transmitting a control message in a wireless communication system, the apparatus comprising:
   a control message generator configured to generate a reference control message;
   a storage configured to store as a previous control message a previously transmitted output control message that has been lastly received by a reception apparatus;
   a joint compressor configured to generate a compressed control message by compressing the reference control message based on the previous control message;
   a switch configured to receive the reference control message and the compressed control message and to output one of the reference control message and the compressed control message according to a switching control signal as an output control message; and
   a transmitter configured to transmit the output control message to the reception apparatus.

2. The apparatus as claimed in claim 1, further comprising a controller configured to generate the switching control signal based on whether or not the previous control message is stored in the storage.

3. The apparatus as claimed in claim 2, wherein the controller is further configured to output the switching control signal to control the switch to output the compressed control message when the previous control message is stored in the storage, and to output the switching control signal to control the switch to output the reference control message when the previous control message is not stored in the storage.

4. The apparatus as claimed in claim 3, wherein the controller is further configured to output the switching control signal to control the switch to output the reference control message when the compressed control message has a larger size than a size of the reference control message, regardless of whether or not the previous control message is stored in the storage.

5. The apparatus as claimed in claim 2, wherein, the controller is further configured to store the previous control message when a first output control message transmitted to the reception apparatus is received by the reception apparatus and to update the previous control message when a subsequent output control message transmitted to the reception apparatus is received by the reception apparatus.

6. The apparatus as claimed in claim 5, wherein the controller is further configured to transmit data to the reception apparatus by using a resource allocated by the output control message and to confirm if the output control message is received by the reception apparatus, based on an acknowledgement message transmitted from the reception apparatus in response to the transmitted data.

7. The apparatus as claimed in claim 5, wherein the controller is further configured to confirm if the output control message is received by the reception apparatus based on an acknowledgement message transmitted from the reception apparatus in response to the output control message.

8. The apparatus as claimed in claim 1, wherein the joint compressor is configured to generate the compressed control message by generating a first control bit value when a bit value at a specific position of a bit stream included in the previous control message is identical to a bit value at the specific position of a bit stream included in the reference control message, generating a second control bit value different from the first control bit value when the bit value at the specific position of the bit stream included in the previous control message is not identical to the bit value at the specific position of the bit stream included in the reference control message, and compressing a control bit stream including the first and second control bit values by using a run-length compression technique.

9. The apparatus as claimed in claim 1, wherein the joint compressor comprises:
    a bit comparator configured to compare the reference control message with the previous control message on a bit-by-bit basis;
    a control bit generator configured to determine a control bit value by using a comparison result for each bit, output from the bit comparator, and to generate a control bit stream by using the determined control bit values; and
    a consecutive bit compressor configured to generate the compressed control message by using a run-length compression technique to compress the control bit stream generated by the control bit generator,
    wherein a bit in the previous control message and a bit in the reference control message, which are compared with each other by the bit comparator, have the same position in the bit stream included in the previous control message and the bit stream included in the reference control message, respectively.

10. A method of transmitting a control message in a wireless communication system, the method comprising the steps of:
    generating a reference control message;
    generating a compressed control message by compressing the reference control message based on a previous control message, wherein the previous control message comprises a previously transmitted output control message that has been lastly received by a reception apparatus;
    selecting as an output control message one of the reference control message and the compressed control message based on a switching control signal; and
    transmitting the output control message to the reception apparatus.

11. The method as claimed in claim 10, wherein the step of generating the compressed message comprises the steps of:
    generating a first control bit value when a bit value at a specific position of a bit stream included in the previous control message is identical to a bit value at the specific position of a bit stream included in the reference control message;
    generating a second control bit value different from the first control bit value when the bit value at the specific position of the bit stream included in the previous control message is not identical to the bit value at the specific position of the bit stream included in the reference control message; and
    compressing a control bit stream including the first and second control bit values by using a run-length compression technique.

12. The method as claimed in claim 10, wherein the step of generating the compressed control message comprises the steps of:
    comparing the previous control message with the reference control message on a bit-by-bit basis;
    generating a control bit stream by using control bit values determined as a result of comparing the previous control message and the reference control message on a bit-by-bit basis; and
    generating the compressed control message by using a run-length compression technique to compress the generated control bit stream,
    wherein a bit in the previous control message and a bit in the reference control message, which are compared with each other, have the same position in the bit stream included in the previous control message and the bit stream included in the reference control message, respectively.

13. The method as claimed in claim 10, wherein the step of selecting one of the reference control message and the compressed control message comprises the steps of:
    selecting the compressed control message when the previous control message exists; and
    selecting the reference control message when the previous control message does not exist.

14. The method as claimed in claim 13, wherein the step of selecting one of the reference control message and the compressed control message further comprises the step of selecting the reference control message when the compressed control message has a larger size than a size of the reference control message, regardless of whether or not the previous control message exists.

15. The method as claimed in claim 10, further comprising the steps of
    transmitting data to the reception apparatus by using a resource allocated by the output control message; and
    confirming if the output control message is received by the reception apparatus based on an acknowledgement message transmitted from the reception apparatus in response to the transmitted data.

16. The method as claimed in claim 10, further comprising the step of confirming if the output control message is received by the reception apparatus based on an acknowledgement message transmitted from the reception apparatus in response to the output control message.

17. The method as claimed in claim 10, further comprising the steps of:
    updating the previous control message by using the output control message when the output control message is received by the reception apparatus; and
    setting the output control message as the previous control message when the output control message is received by the reception apparatus and the previous control message does not exist.

18. The method as claimed in claim 10, wherein the step of generating a reference control message comprises the step of generating the reference control message by arranging multiple control information based on an arrangement scheme prearranged with the reception apparatus when multiple control information is transmitted using one output control message.

19. The method as claimed in claim 18, wherein the arrangement scheme is determined by transmitting a plurality of output control messages in a predetermined cycle, grading each of the control information in each of the transmitted output control messages according to a change characteristic thereof, and configuring an arrangement sequence in which similarly graded control information neighbor each other in one output control message.

20. The method as claimed in claim 19, wherein the arrangement sequence is transmitted to the reception apparatus by using an arrangement sequence change message.

21. An apparatus for receiving a control message in a wireless broadcast communication system, the apparatus comprising:
a receiver configured to receive a control message transmitted from a transmission apparatus;
a controller configured to generate a switching control signal based on an identifier indicating a compression or a non-compression included in the received control message;
a switch configured to output the received control message to any one of two output ends according to the switching control signal; and
a joint decompressor configured to identify each bit value of a bit stream included in the received control message output according to the switching control signal and to output a bit value identical to the identified bit value or a reversed bit value thereof from a bit stream included in a lastly received jointly compressed control message.

22. The apparatus as claimed in claim 21, wherein the joint decompressor comprises:
a consecutive bit decompressor configured to decompress control information included in the received control message output from the switch by using a run-length compression technique;
a bit comparator configured to identify each bit value of the decompressed control information and to output a bit value identical to the identified bit value or a reversed bit value thereof from a bit stream included in the lastly received jointly compressed control message; and
a control bit generator configured to output the identical bit value or the reversed bit value thereof, output from the bit comparator, into one control bit stream.

23. The apparatus as claimed in claim 21, wherein the switch is further configured to output the received control message for use by the apparatus which is one of the two output ends, if the switching control signal is a switching control signal based on the identifier indicating the non-compression, and output the received control message to the joint decompressor which is another one of the two output ends, if the switching control signal is a switching control signal based on the identifier indicating the compression.

24. A method of receiving a control message in a wireless communication system, the method comprising the steps of:
receiving a control message transmitted from a transmission apparatus;
generating a switching control signal based on an identifier indicating compression or non-compression included in the received control message;
outputting the received control message to any one of two output ends according to the switching control signal; and
identifying each bit value in a bit stream included in the received control message output according to the switching control signal, and outputting, as a decompression bit value, a bit value identical to the identified bit value or a reversed bit value thereof from a bit stream included in a lastly received jointly compressed control message.

25. The method as claimed in claim 24, wherein the step of outputting the decompressed bit value comprises the steps of:
decompressing control information included in the received control message output according to the switching control signal by using a run-length compression technique;
identifying each bit value of the decompressed control information, and outputting a bit value identical to the identified bit value or a reversed bit value thereof from a bit stream included in the lastly received jointly compressed control message; and
outputting the identical bit value or the reversed bit value thereof into one control bit stream.

26. The method as claimed in claim 24, wherein the step of outputting the received control message to any one of two output ends according to the switching control signal comprises the steps of:
outputting the received control message for use by the apparatus which is one of the two output ends, if the switching control signal is a switching control signal based on the identifier indicating the non-compression; and
outputting the received control message to a joint decompressor for outputting the decompression bit value which is another one of the two output ends, if the switching control signal is a switching control signal based on the identifier indicating the compression.

* * * * *